F. A. BRINKER.
PIPE JOINT.
APPLICATION FILED OCT. 29, 1914.

1,149,715.

Patented Aug. 10, 1915.

UNITED STATES PATENT OFFICE.

FREDERIC A. BRINKER, OF MISSOURI VALLEY, IOWA, ASSIGNOR OF ONE-HALF TO ROY G. WALTON, OF MISSOURI VALLEY, IOWA.

PIPE-JOINT.

1,149,715.

Specification of Letters Patent.

Patented Aug. 10, 1915.

Application filed October 29, 1914. Serial No. 869,187.

*To all whom it may concern:*

Be it known that I, FREDERIC A. BRINKER, a citizen of the United States, residing at Missouri Valley, in the county of Harrison and State of Iowa, have invented certain new and useful Improvements in Pipe-Joints, of which the following is a specification.

This invention relates to pipe joints, and has for its object to provide an improved pipe joint particularly useful in flexible steam pipes, that is, pipes containing joints which are capable of being turned to make the desired connections or which are flexible after the joints are connected.

In flexible pipe couplings heretofore made objections on account of leaks have existed incident to wear of the contacting parts, especially where the joints are subjected to frequent movement. My invention is designed to remedy these defects, and to provide a flexible joint in which the parts subject to wear can be easily and cheaply renewed, without renewing the more expensive parts thereof.

An embodiment of the invention is illustrated in the accompanying drawing, in which—

Figure 1:
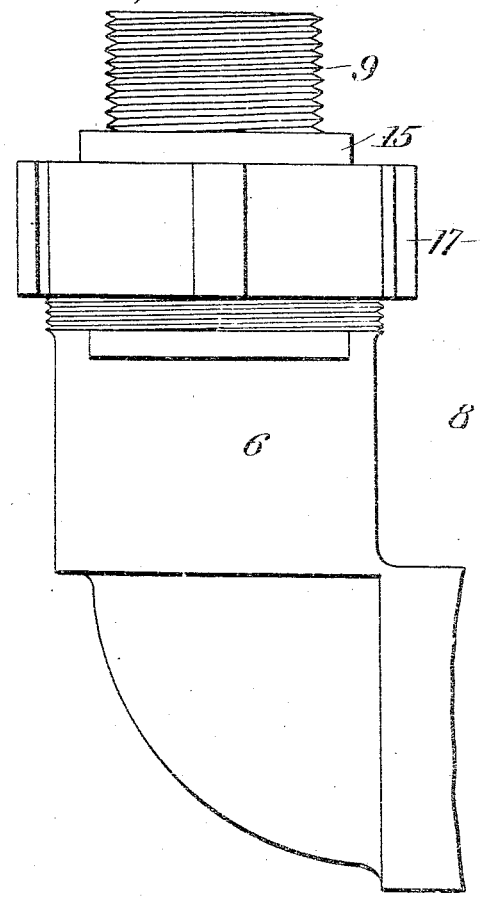
Figure 2:
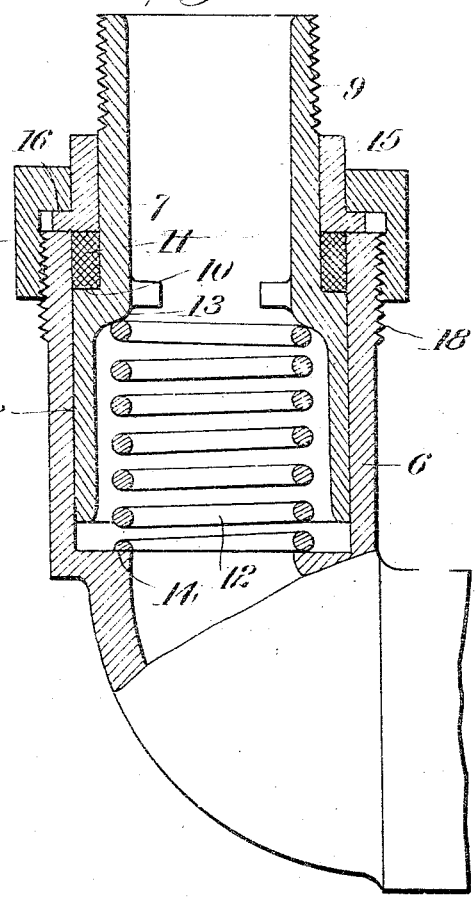

Figure 1 is a side elevation of the joint, and Fig. 2 is a longitudinal section.

Referring specifically to the drawings, 6 indicates one pipe member of the joint, and 7 is the other, the latter being in the form of a cuff which is machined to fit snugly within the bore of the outer section 6, the meeting surfaces being indicated at 8. The cuff 7 is threaded as indicated at 9 to receive an adjacent pipe member. The outer end of the cuff 7 is reduced to form a shoulder 10, presented outwardly, and a ring 11 of graphite or similar packing material is seated against this shoulder, fitting between the cuff and the outer pipe. A coiled spring 12 is located within the cuff, in compression between the inside shoulder 13 thereon and a shoulder 14 in the pipe section 6, and said spring tends to force the cuff outwardly. A collar 15 fits snugly upon and surrounds the reduced projecting end of the cuff, and rests against the graphite ring 11, and this collar has a flange 16 which is engaged by a flanged nut 17, which screws on external threads 18 on the pipe section 6 and draws the collar 15 down against the end of said pipe section, as shown in Fig. 2, thereby compressing the spring 12, which compression holds the shoulder 10 on the cuff in close contact with the ring 11 and also holds the said ring tightly against the collar 15, thereby providing a tight joint. When the parts are so connected up, the cuff 7 may be turned within the pipe section 6, to any angle desired in use. The main part of the wear incident to such turning occurs between the nut 16 and the collar 15, or between said collar and the cuff 7, and when the collar becomes worn a new one can be slipped on without renewing the cuff 7. When the nut 17 engages the sleeve directly and the joint is frequently flexed, the nut will wear a groove in the sleeve, permitting leak and requiring the substitution of a whole new sleeve.

I claim:—

A flexible pipe coupling comprising an outer member, an inner cuff rotatable within the same and having a shoulder, and a reduced part within the outer member and spaced therefrom, a packing ring located in said space and resting against said shoulder, a collar fitting closely around the cuff in wear-resisting contact therewith, and against said ring, said collar having an external flange, and a nut on the outer member engaging said flange and clamping the same against the end of the outer member.

In testimony whereof, I affix my signature in presence of two witnesses.

FREDERIC A. BRINKER.

Witnesses:
R. H. HARRIS,
T. L. FINLEY.